United States Patent
Okamoto et al.

(10) Patent No.: US 11,816,026 B2
(45) Date of Patent: Nov. 14, 2023

(54) DIGITAL SIGNAL PROCESSING DEVICE AND CONTROL METHOD OF DIGITAL SIGNAL PROCESSING DEVICE

(71) Applicant: KABUSHIKI KAISHA KAWAI GAKKI SEISAKUSHO, Hamamatsu (JP)

(72) Inventors: Seiji Okamoto, Hamamatsu (JP); Tetsuya Hirano, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 0 days.

(21) Appl. No.: 17/499,037

(22) Filed: Oct. 12, 2021

(65) Prior Publication Data

US 2022/0114085 A1    Apr. 14, 2022

(30) Foreign Application Priority Data

Oct. 13, 2020 (JP) ................ 2020-172560

(51) Int. Cl.
  *G06F 12/00* (2006.01)
  *G06F 13/00* (2006.01)
  *G06F 12/02* (2006.01)
  *G06F 13/16* (2006.01)
  *G06F 3/16* (2006.01)

(52) U.S. Cl.
  CPC ............ *G06F 12/023* (2013.01); *G06F 3/162* (2013.01); *G06F 13/1668* (2013.01); *G06F 2212/251* (2013.01)

(58) Field of Classification Search
  CPC ........ G06F 12/00; G06F 12/023; G06F 13/00; G06F 3/162; G06F 13/1668; G06F 2212/251
  See application file for complete search history.

(56) References Cited

U.S. PATENT DOCUMENTS

| 2013/0159608 | A1* | 6/2013 | Shin ................ G06F 3/0659 711/E12.001 |
| 2017/0364469 | A1* | 12/2017 | Crisp ................ G06F 13/4068 |
| 2021/0398551 | A1* | 12/2021 | Nandy ................ G10L 15/22 |

FOREIGN PATENT DOCUMENTS

| JP | 58-2935 A | 1/1983 |
| JP | 62-57067 A | 3/1987 |
| JP | 2003-108122 A | 4/2003 |

* cited by examiner

*Primary Examiner* — Tuan V Thai
(74) *Attorney, Agent, or Firm* — Birch, Stewart, Kolasch & Birch, LLP

(57) ABSTRACT

A digital signal processing device includes: a delay means that delays audio data in units of sampling periods; and a control means that writes audio data to a first buffer memory one word at a time in sequence at a sampling period, performs control to burst transfer burst length audio data to a DRAM from the first buffer memory, performs control to burst transfer the burst length audio data to a second buffer memory from the DRAM, and outputs audio data to the delay means from the second buffer memory one word at a time in sequence at the sampling period, in which a delay time of audio data output by the delay means is determined by a combination of a delay time of multiple sampling period units depending on a burst length of the DRAM and a delay time of a sampling period unit of the delay means.

10 Claims, 3 Drawing Sheets

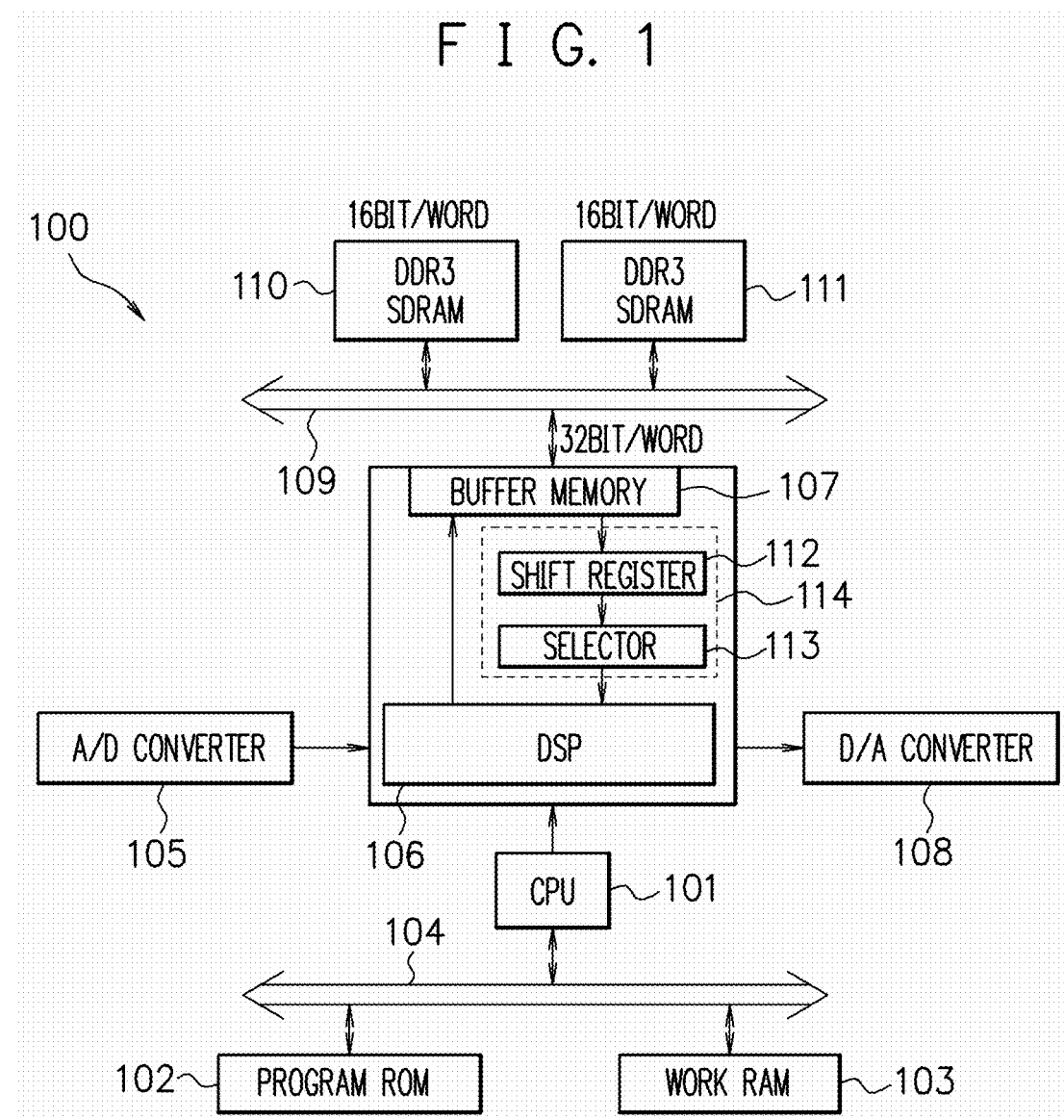

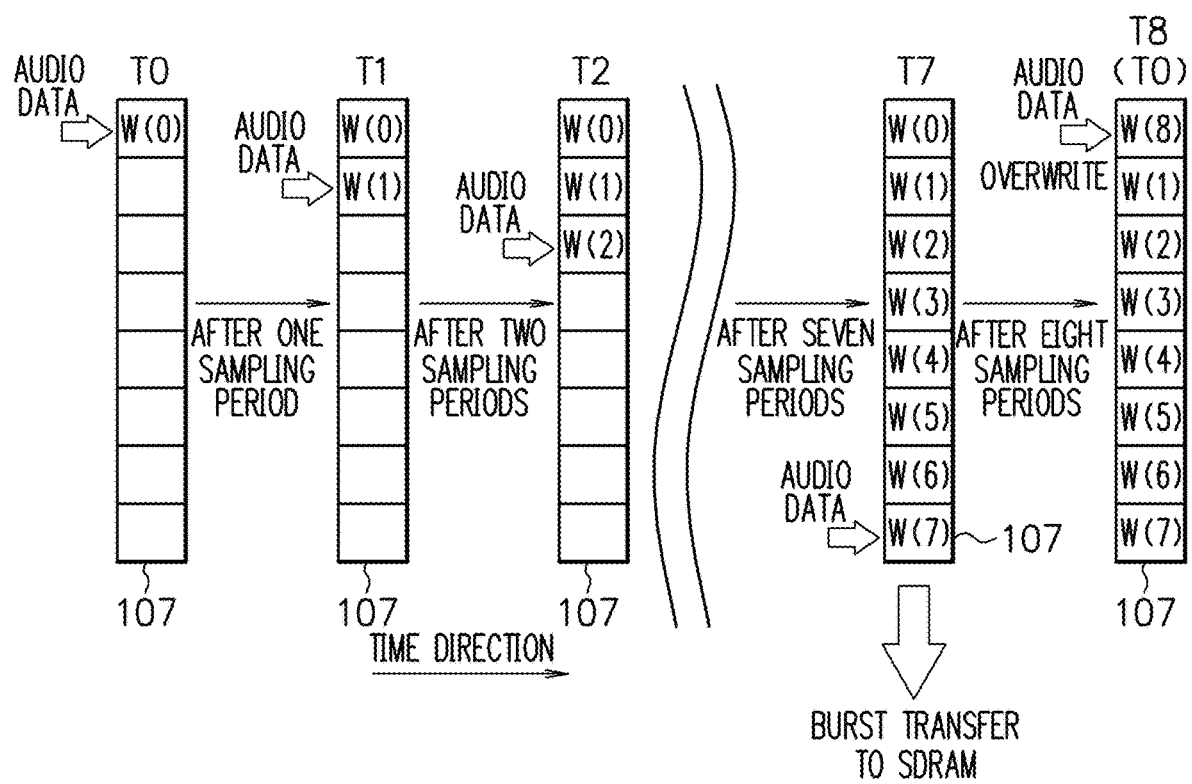

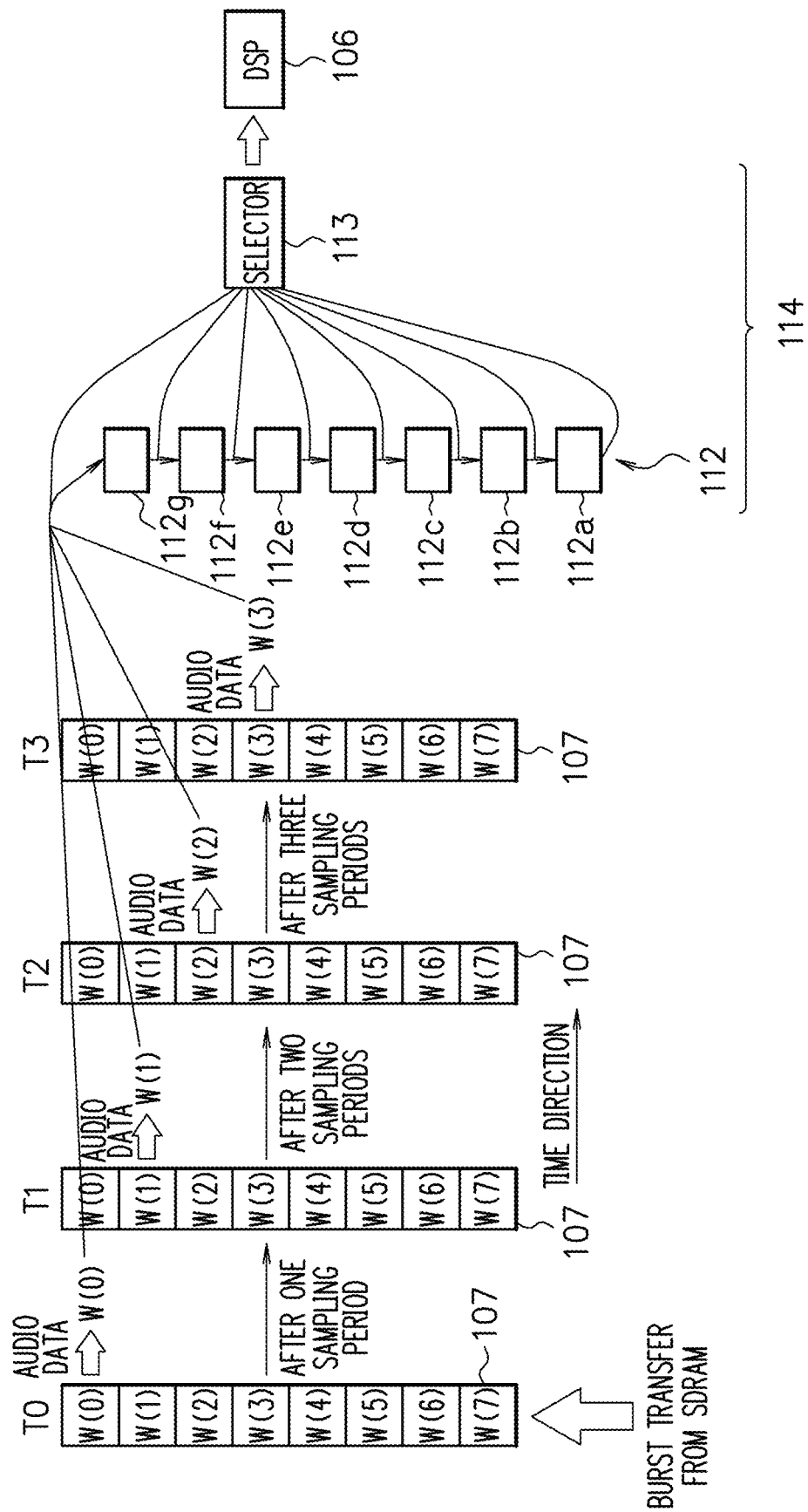

DIGITAL SIGNAL PROCESSING DEVICE AND CONTROL METHOD OF DIGITAL SIGNAL PROCESSING DEVICE

CROSS-REFERENCE TO RELATED APPLICATIONS

This application is based upon and claims the benefit of priority of the prior Japanese Patent Application No. 2020-172560, filed on Oct. 13, 2020, the entire contents of which are incorporated herein by reference.

BACKGROUND OF THE INVENTION

Field of the Invention

The present invention relates to a digital signal processing device and a control method of the digital signal processing device.

Description of the Related Art

Patent Document 1 describes an address circuit for virtual shifting within a digital signal processing device. In the address circuit, an index register is combined with an auxiliary index register, the same value as a low-order value of the index register is set in the auxiliary index register, an upper address is taken from the index register and a lower address is taken from the auxiliary index register to perform normal index modification, and a value, which is obtained by adding a low order of the index register and a pointer, is set in the auxiliary index register to perform address modification for virtual shifting.

Patent Document 2 describes an address generation circuit including a first counter and a second counter. A clearing means selectively clears the contents of the second counter to zero by a counting control signal to the first counter. An adder adds an output of the first counter and an output of the second counter.

Patent Document 3 describes a digital signal processing device for sound waveform data including a waveform signal processing unit and a memory access unit. The waveform signal processing unit performs waveform signal processing intended for adding effects to sound waveform data by means of N, (which is an integer of two or more), pieces of time-division waveform signal processing. The memory access unit enables a DRAM attached externally with K banks corresponding to K, (which is an integer of two or more and M or less), pieces of time-division waveform signal processing intended for delaying sound waveform data in the process of waveform signal processing to start access to the K banks at K timings different from each other, and when receiving a write or read request from one of K pieces of the time-division waveform signal processing, the memory access unit writes or reads sound waveform data by outputting a control signal, which is intended for writing to or reading from the corresponding bank, to the DRAM at a timing at which access to the bank can be started.

[Patent Document 1] Japanese Laid-open Patent Publication No. 58-2935

[Patent Document 2] Japanese Laid-open Patent Publication No. 62-57067

[Patent Document 3] Japanese Laid-open Patent Publication No. 2003-108122

In Patent Document 3, the sound waveform data are delayed in order to add effects to the sound waveform data. However, when using burst transfer of the DRAM, the delay time of the sound waveform data is limited to a multiple of a burst length. If all a plurality of delay signals are a multiple of the burst length, their periodicity causes a strong correlation to appear, failing to achieve high-quality effects.

SUMMARY OF THE INVENTION

An object of the present invention is to enable the generation of audio data having a delay time obtained by combining a delay time that is a multiple of a burst length with respect to a sampling period and a delay time of a sampling period unit.

A digital signal processing device of the present invention includes: a first buffer memory intended for accumulating audio data; a second buffer memory intended for accumulating audio data; a DRAM that burst transfers burst length audio data; a delay means that delays audio data in units of sampling periods; and a control means that writes audio data to the first buffer memory one word at a time in sequence at the sampling period, performs control to burst transfer the burst length audio data to the DRAM from the first buffer memory, performs control to burst transfer the burst length audio data to the second buffer memory from the DRAM, and outputs audio data to the delay means from the second buffer memory one word at a time in sequence at the sampling period, in which a delay time of audio data output by the delay means is determined by a combination of a delay time of multiple sampling period units depending on the burst length of the DRAM and a delay time of a sampling period unit of the delay means.

A control method of a digital signal processing device of the present invention is a control method of a digital signal processing device including: a first buffer memory intended for accumulating audio data; a second buffer memory intended for accumulating audio data; a DRAM that burst transfers burst length audio data; and a delay means that delays audio data in units of sampling periods, the method including: writing audio data to the first buffer memory one word at a time in sequence at the sampling period; performing control to burst transfer the burst length audio data to the DRAM from the first buffer memory; performing control to burst transfer the burst length audio data to the second buffer memory from the DRAM; and outputting audio data to the delay means from the second buffer memory one word at a time in sequence at the sampling period, in which a delay time of audio data output by the delay means is determined by a combination of a delay time of multiple sampling period units depending on the burst length of the DRAM and a delay time of a sampling period unit of the delay means.

BRIEF DESCRIPTION OF THE DRAWINGS

FIG. 1 is a diagram illustrating a configuration example of a digital signal processing device according to this embodiment;

FIG. 2 is a view illustrating an access method of a first buffer memory; and

FIG. 3 is a view illustrating an access method of a second buffer memory.

DETAILED DESCRIPTION OF THE PREFERRED EMBODIMENTS

FIG. 1 is a diagram illustrating a configuration example of a digital signal processing device 100 according to this embodiment. The digital signal processing device 100 is an effect device that makes reverb, for example. When an original sound is generated, a direct sound and a delayed sound of the original sound are synthesized to reach a human ear. The direct sound is sound of the original sound reaching a human ear directly. The delayed sound is a plurality of delayed sounds with different delay times that are generated by the original sound being reflected from various objects. The digital signal processing device 100 generates a plurality of delay signals with different delay times for audio data of the original sound and synthesizes the audio data of the original sound and a plurality of the delay signals, to thereby make reverb.

The digital signal processing device 100 includes a CPU 101, a program ROM 102, a work RAM 103, a bus 104, an analog/digital converter 105, a DSP 106, first and second buffer memories 107, a digital/analog converter 108, a bus 109, a SDRAM 110, a SDRAM 111, and a delay unit 114. The delay unit 14 includes a shift register 112 and a selector 113. There will be explained a control method of the digital signal processing device 100 below.

Each of the first and second buffer memories 107 is capable of receiving and outputting 32-bit (one-word) wide audio data from and to the bus 109. The first and second buffer memories 107 are, for example, a SRAM (static random access memory) and can accumulate audio data.

The SDRAMs 110 and 111 are a synchronous dynamic random access memory and are a type of DRAM (dynamic random access memory). The SDRAMs 110 and 111 are, for example, a DDR3 SDRAM.

The SDRAM 110 is capable of receiving and outputting 16-bit (one-word) audio data from and to the bus 109. The SDRAM 110 is capable of receiving and outputting 16-bit (one-word) audio data from and to the bus 109.

Each of the first and second buffer memories 107 can receive and output 32-bit (one-word) audio data from and to the SDRAMs 110 and 111 via the bus 109. The 16-bit audio data that are input to and output from the SDRAM 110 are the upper 16-bit audio data of the 32-bit audio data that are input to and output from the first or second buffer memory 107. The 16-bit audio data that are input to and output from the SDRAM 111 are the lower 16-bit audio data of the 32-bit audio data that are input to and output from the first or second buffer memory 107.

The SDRAMs 110 and 111 are capable of burst transferring burst length audio data, which are two words or more, to each of the first and second buffer memories 107 via the bus 109. That is, the SDRAMs 110 and 111 continuously and rapidly transfer audio data with a word count that is a burst length, to each of the first and second buffer memories 107 based on one piece of address information via the bus 109. The burst length is, for example, four words or eight words. The case where the burst length is eight words will be explained below as an example.

The CPU 101 is a central processing unit. The program ROM (read-only memory) 102 stores a program. The work RAM (random access memory) 103 functions as a work region for the CPU 101. The CPU 101 expands the program stored in the program ROM 102 to the work RAM 103 and executes the program expanded in the work RAM 103, to thereby control the DSP 106. The DSP 106 is a digital signal processor and is a type of control unit.

The analog/digital converter 105 receives an analog audio signal of the original sound from a microphone or the like, and converts the analog audio signal into digital one-word (32-bit) audio data at a sampling period. The audio data are musical sound data or voice data.

The DSP 106 writes the digital audio data converted by the analog/digital converter 105 to the first buffer memory 107 one word at a time in sequence at a sampling period. Note that the DSP 106 may receive digital audio data from a musical sound generation device, audio receiving device, or the like instead of the analog/digital converter 105.

Then, the DSP 106 performs control to burst transfer the audio data with a word count (eight words) that is the burst length to the SDRAMs 110 and 111 from the first buffer memory 107. The DSP 106 writes the audio data with a word count (eight words) that is the burst length to addresses indicated by write pointers of the SDRAMs 110 and 111.

Then, the DSP 106 performs control to burst transfer the audio data with a word count (eight words) that is the burst length to the second buffer memory 107 from the SDRAMs 110 and 111. On this occasion, the DSP 106 reads the audio data with a word count (eight words) that is the burst length from addresses indicated by read pointers of the SDRAMs 110 and 111 and performs control to burst transfer them. The DSP 106 writes the audio data with a word count (eight words) that is the burst length to the second buffer memory 107 by the burst transfer.

The difference between the addresses indicated by the write pointers and the addresses indicated by the read pointers of the SDRAMs 110 and 111 corresponds to a delay time of the delay signal responsive to the original sound. This delay time is a delay time that is a multiple of the burst length (a multiple of 8) with respect to the sampling period.

Instead of the SDRAMs 110 and 111, a SRAM can be used to generate delay signals, but a SRAM with a large capacity is required in order to generate delay signals with long delay times. The SRAM has the disadvantage of being more expensive than the SDRAMs 110 and 111. Thus, in this embodiment, using the SDRAMs 110 and 111 enables the generation of delay signals, thereby making it possible to reduce the cost. Further, using the burst transfer of the SDRAMs 110 and 111 makes it possible to rapidly generate a large number of delay signals in real time.

Then, the DSP 106 reads the audio data transferred to the second buffer memory 107 in units of one word at a sampling period to output the read audio data to the delay unit 114.

The delay unit 114 includes the shift register 112 and the selector 113, and delays the audio data read from, the second buffer memory 107 in units of sampling periods and outputs the delayed audio data to the DSP 106 as a delay signal.

The shift register 112 includes a plurality of registers intended for accumulating the audio data read from the second buffer memory 107, and shifts the audio data accumulated in a plurality of the registers in units of sampling periods. The selector 113 selects one of the data output from at least a plurality of the registers and outputs the selected output data to the DSP 106 as a delay signal responsive to the original sound. The selection of the selector 113 corresponds to the delay time of the delay signal responsive to the original sound.

Then, the DSP 106 synthesizes the audio data of the original sound converted by the analog/digital converter 105 and the above-described delay signal, and outputs synthesized audio data to the digital/analog converter 108. Incidentally, the DSP 106 does not necessarily have to synthesize them, but a device external to the DSP 106 may synthesize them.

The digital/analog converter 108 converts the digital one-word (32-bit) audio data into an analog audio signal at a sampling period, and outputs the analog audio signal to an audio system. The audio system includes an amplifier and a speaker, in which the amplifier amplifies the audio signal and the speaker pronounces the amplified audio signal. As a result, a sound with the effect of reverb added to the original sound is pronounced.

FIG. 2 is a view illustrating an access method of the first buffer memory 107. The first buffer memory 107 is a ring buffer that is capable of accumulating eight-word audio data. Sampling periods T0 to T8 each are a sampling period of the analog/digital converter 105.

At the sampling period T0, the DSP 106 writes one-word audio data W(0) converted by the analog/digital converter 105 to a first address the first buffer memory 107.

The sampling period T1 is a sampling period after one sampling period relative to the sampling period T0. At the sampling period T1, the DSP 106 writes one-word audio data W(1) converted by the analog/digital converter 105 to a second address in the first buffer memory 107.

The sampling period T2 is a sampling period after two sampling periods relative to the sampling period T0. At the sampling period T2, the DSP 106 writes one-word audio data W(2) converted by the analog/digital converter 105 to a third address in the first buffer memory 107.

Similarly, at the sampling periods T3 to T6, the DSP 106 writes one-word audio data W(3) to one-word audio data W(6) that are converted by the analog/digital converter 105 to a fourth address to a seventh address in the first buffer memory 107 respectively.

The sampling period T7 is a sampling period after seven sampling periods relative to the sampling period T0. At the sampling period T7, the DSP 106 writes one-word audio data W(7) converted by the analog/digital converter 105 to an eighth address in the first buffer memory 107.

The DSP 106 burst transfers the eight-word audio data W(0) to W(7) that are accumulated in the first buffer memory 107 to the SDRAMs 110 and 111 to write the eight word audio data W(0) to W(7) to the SDRAMs 110 and 111 at the sampling period T7.

The sampling period T0 (T0) is a sampling period after eight sampling periods relative to the sampling period T0. At the sampling period T8 (T0), the DSP 106 writes (overwrites) one-word audio data W(8) converted by the analog/digital converter 105 to the first address in the first buffer memory 107.

Similarly, at sampling periods T9 to T15, the DSP 106 writes (overwrites) one-word audio data W(9) to one-word audio data W(15) that are converted by the analog/digital converter 105 to the second address to the eighth address in the first buffer memory 107 respectively.

Thereafter, the DSP 106 burst transfers the eight-word audio data W(8) to W(15) that are accumulated in the first buffer memory 107 to the SDRAMs 110 and ill to write the eight-word audio data W(8) to W(15) to the SDRAMs 110 and at the sampling period 115.

Similarly, the DSP 106 burst transfers, every eight sampling periods, the audio data accumulated in the first buffer memory 107 to the SDRAMs 110 and 111 in units of eight words below.

As above, the DSP 106 performs control to write the audio data converted by the analog/digital converter 105 to the first buffer memory 107 one word at a time in sequence at the sampling periods T0 to T0 and burst transfer the burst length audio data to the SDRAMs 110 and 111 from the first buffer memory 107 every eight sampling periods.

FIG. 3 is a view illustrating an access method of the second buffer memory 107. The second buffer memory 107 is a ring buffer that is capable of accumulating eight-word audio data. Sampling periods T0 to T3 each are a sampling period of the analog/digital converter 105.

The delay unit 114 includes the shift register 112 and the selector 113. The shift register 112 includes seven registers 112a to 112g intended for accumulating audio data, and shifts the audio data accumulated in the seven registers 112a to 112g in units of sampling periods. The selector 113 selects one of the audio data output from the second buffer memory 107 and the data output from the seven registers 112a to 112g.

At the sampling period T0, the DSP 106 burst transfers the audio data with a word count (eight words) that is the burst length W(0) to W(7), which are stored in the SDRAMs 110 and 111, to the second buffer memory 107.

In FIG. 2, the DSP 106 writes the audio data accumulated in the first buffer memory 107 to the addresses indicated by the write pointers of the SDRAMs 110 and 111. At the sampling period T0 in FIG. 3, the DSP 106 reads the audio data from the addresses indicated by the read pointers of the SDRAMs 110 and 111. The difference between the addresses indicated by the write pointers and the addresses indicated by the read pointers of the SDRAMs 110 and 111 corresponds to a delay time of the delay signal responsive to the original sound. This delay time is a multiple of 8 of the sampling period (a multiple of a count of the burst length).

At the sampling period T0, the DSP 106 reads the one-word audio data W(0) accumulated at a first address in the second buffer memory 107 and outputs the read audio data W(0) to the shift register 112 and the selector 113. In the register 112g of the shift register 112, the audio data W(0) are accumulated.

At the sampling period T1, the DSP 106 reads the one-word audio data W(1) accumulated at a second address in the second buffer memory 107 and outputs the read audio data W(1) to the shift register 112 and the selector 113. The shift register 112 shifts the audio data accumulated in the registers 112a to 112g. In the register 112f, the audio data W(0) are accumulated. In the register 112g, the audio data W(1) are accumulated.

At the sampling period T2, the DSP 106 reads the one-word audio data W(2) accumulated at a third address in the second buffer memory 107 and outputs the read audio data W(2) to the shift register 112 and the selector 113. The shift register 112 shifts the audio data accumulated in the registers 112a to 112g. In the register 112e, the audio data W(0) are accumulated. In the register 112f, the audio data W(1) are accumulated. In the register 112g, the audio data W(2) are accumulated.

At the sampling period T3, the DSP 106 reads the one-word audio data W(3) accumulated at a fourth address in the second buffer memory 107 and outputs the read audio data W(3) to the shift register 112 and the selector 113. The shift register 112 shifts the audio data accumulated in the registers 112a to 112g. In the register 112d, the audio data W(0) are accumulated. In the register 112e, the audio data. W(1) are accumulated. In the register 112f, the audio data W(2) are accumulated. In the register 112g, the audio data W(3) are accumulated.

Similarly, at sampling periods T4 to T6, the DSP 106 reads the audio data W(4) to the audio data W(6) accumulated in the second buffer memory 107 and outputs the read audio data W(4) to the read audio data W(6) to the shift register 112 and the selector 113.

At a sampling period T7, the DSP 106 reads the one-word audio data W(7) accumulated at an eighth address in the second buffer memory 107 and outputs the read audio data W(7) to the shift register 112 and the selector 113. The shift register 112 shifts the audio data accumulated in the registers 112a to 112g. In the registers 112a to 112g, the audio data W(0) to the audio data W(7) are accumulated respectively.

Thereafter, the digital signal processing device 100 performs the above-described processing at the sampling periods T0 to T7 repeatedly. The DSP 106 performs control to burst transfer the burst length (eight-word) audio data to the second buffer memory 107 from the SDRAMs 110 and 111 every eight sampling periods, and outputs the audio data to the delay unit 114 from the second buffer memory 107 one word at a time in sequence at a sampling period.

The shift register 112 shifts the audio data accumulated in the seven registers 112a to 112g in units of sampling periods. The seven registers 112a to 112g each output the audio data accumulated in their own registers to the selector 113.

The selector 113 selects one of the audio data read from the second buffer memory 107 and the data output from the seven registers 112a to 112g according to setting of the delay time, and outputs a delay signal responsive to the original sound to the DSP 106.

When selecting the audio data read from the second buffer memory 107 to output the selected audio data to the DSP 106, the selector 113 can generate a delay signal having a delay time that is a multiple of 8 of the sampling period.

Further, when selecting the audio data output from the register 112g to output the selected audio data to the DSP 106, the selector 113 can generate a delay signal having a delay time that is (a multiple of 8 of the sampling period)+(the sampling period)×1.

Further, when selecting the audio data output from the register 112f to output the selected audio data to the DSP 106, the selector 113 can generate a delay signal having a delay time that is (a multiple of 8 of the sampling period)+(the sampling period)×2.

Further, when selecting the audio data output from the register 112e to output the selected audio data to the DSP 106, the selector 113 can generate a delay signal having a delay time that is (a multiple of 8 of the sampling period)+(the sampling period)×3.

Further, when selecting the audio data output from the register 112d to output the selected audio data to the DSP 106, the selector 113 can generate a delay signal having a delay time that is (a multiple of 8 of the sampling period)+(the sampling period)×4.

Further, when selecting the audio data output from the register 112c to output the selected audio data to the DSP 106, the selector 113 can generate a delay signal having a delay time that is (a multiple of 8 of the sampling period)+(the sampling period)×5.

Further, when selecting the audio data output from the register 112b to output the selected audio data to the DSP 106, the selector 113 can generate a delay signal having a delay time that is (a multiple of 8 of the sampling period)+(the sampling period)×6.

Further, when selecting the audio data output from the register 112a to output the selected audio data to the DSP 106, the selector 113 can generate a delay signal having a delay time that is (a multiple of 8 of the sampling period)+(the sampling period)×7.

As above, the delay unit 114 can generate not only a delay signal having a delay time that is a multiple of 8 of the sampling period (a multiple of the burst length), but also a delay signal having a delay time of a sampling period unit. The delay time of the audio data output by the delay unit 114 is determined by a combination of the delay time of the multiple sampling period units depending on the burst length of the SDRAMs 110 and 111 and the delay time of the sampling period unit of the delay unit 114.

Incidentally, the delay unit 114 is not limited to the case of using the shift register 112 and the selector 113. For example, the delay unit 114 may delay the audio data in units of sampling periods by using random access of an SRAM.

The DSP 106 receives the delay signal from the selector 113, and synthesizes the audio data of the original sound converted by the analog/digital converter 105 and the delay signal. The delay unit 114 generates a plurality of delay signals with different delay times through time-division processing, and the DSP 106 synthesizes the audio data of the original sound and a plurality of the delay signals, thereby making it possible to make high quality reverb.

When all a plurality of the delay signals are a multiple of the burst length of the sampling period, their periodicity causes a strong correlation to appear, failing to make high-quality reverb. According to this embodiment, the delay unit 114 can generate not only a delay signal having a delay time that is a multiple of the burst length of the sampling period, but also a delay signal having a delay time of the sampling period unit, and thus it is possible to make high-quality reverb.

According to the present embodiment, it is possible to generate audio data having a delay time obtained by combining a delay time that is a multiple of the burst length with respect to the sampling period and a delay time of a sampling period unit.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A digital signal processing device, comprising:
a first buffer memory intended for accumulating audio data;
a second buffer memory intended for accumulating audio data;
a DRAM that burst transfers burst length audio data;
a delay means that delays audio data in units of sampling periods; and
a control means that writes audio data to the first buffer memory one word at a time in sequence at the sampling period, performs control to burst transfer the burst length audio data to the DRAM from the first buffer memory, performs control to burst transfer the burst length audio data to the second buffer memory from the DRAM, and outputs audio data to the delay means from the second buffer memory one word at a time in sequence at the sampling period, wherein
a delay time of audio data output by the delay means is determined by a combination of a delay time of multiple sampling period units depending on the burst length of the DRAM and a delay time of a sampling period unit of the delay means, wherein
the delay means includes:
a shift register including a plurality of registers intended for accumulating the audio data, the shift register that shifts the audio data accumulated in a plurality of the registers in units of sampling periods; and
a selector that selects one of data output from at least a plurality of the registers.

2. The digital signal processing device according to claim 1, wherein
the selector selects one of audio data output from the second buffer memory and data output from a plurality of the registers.

3. The digital signal processing device according to claim 2, wherein
the DRAM is a SDRAM.

4. The digital signal processing device according to claim 1, wherein
the DRAM is a SDRAM.

5. A control method of a digital signal processing device including:
a first buffer memory intended for accumulating audio data;
a second buffer memory intended for accumulating audio data;
a DRAM that burst transfers burst length audio data; and
a delay means that delays audio data in units of sampling periods, the method comprising:
writing audio data to the first buffer memory one word at a time in sequence at the sampling period;
performing control to burst transfer the burst length audio data to the DRAM from the first buffer memory;
performing control to burst transfer the burst length audio data to the second buffer memory from the DRAM; and
outputting audio data to the delay means from the second buffer memory one word at a time in sequence at the sampling period, wherein
a delay time of audio data output by the delay means is determined by a combination of a delay time of multiple sampling period units depending on the burst length of the DRAM and a delay time of a sampling period unit of the delay means,
wherein
the delay means includes:
a shift register including a plurality of registers intended for accumulating the audio data, the shift register that shifts the audio data accumulated in a plurality of the registers in units of sampling periods; and
a selector that selects one of data output from at least a plurality of the registers.

6. A digital signal processing device, comprising:
a first buffer memory intended for accumulating audio data;
a second buffer memory intended for accumulating audio data;
a DRAM that burst transfers burst length audio data;
a delay means that delays audio data in units of sampling periods; and
a control means that writes audio data to the first buffer memory one word at a time in sequence at the sampling period, performs control to burst transfer the burst length audio data to the DRAM from the first buffer memory, performs control to burst transfer the burst length audio data to the second buffer memory from the DRAM, and outputs audio data to the delay means from the second buffer memory one word at a time in sequence at the sampling period, wherein
a delay time of audio data output by the delay means is determined by a combination of a delay time of multiple sampling period units depending on the burst length of the DRAM and a delay time of a sampling period unit of the delay means, wherein
the first buffer memory writes audio data one word at a time in sequence at the sampling period,
the first buffer memory burst transfers the burst length audio data to the DRAM,
the DRAM writes the burst length audio data,
the DRAM burst transfers the burst length audio data to the second buffer memory,
the second buffer memory writes the burst length audio data,
the second buffer memory outputs the audio data to the delay means one word at a time in sequence at the sampling period, and
the delay means delays the audio data in units of the sampling periods.

7. The digital signal processing device according to claim 6, wherein
a delay time of the delay means is a delay time of an integer multiple of 1 or more of the sampling period,
a delay time of audio data output by the DRAM is a delay time of an integer multiple of 1 or more of the burst length,
the burst length is a length of multiple words, and
the delay time of the audio data output by the delay means is the sum of the delay time of the audio data output by the DRAM and the delay time of the delay means.

8. A digital signal processing device, comprising:
a first buffer memory intended for accumulating audio data;
a second buffer memory intended for accumulating audio data;
a DRAM that burst transfers burst length audio data;
a delay means that delays audio data in units of sampling periods; and
a control means that writes audio data to the first buffer memory one word at a time in sequence at the sampling period, performs control to burst transfer the burst length audio data to the DRAM from the first buffer memory, performs control to burst transfer the burst length audio data to the second buffer memory from the DRAM, and outputs audio data to the delay means from the second buffer memory one word at a time in sequence at the sampling period, wherein
a delay time of audio data output by the delay means is determined by a combination of a delay time of multiple sampling period units depending on the burst length of the DRAM and a delay time of a sampling period unit of the delay means, wherein
a delay time of the delay means is a delay time of an integer multiple of 1 or more of the sampling period,
a delay time of audio data output by the DRAM is a delay time of an integer multiple of 1 or more of the burst length,
the burst length is a length of multiple words, and
the delay time of the audio data output by the delay means is the sum of the delay time of the audio data output by the DRAM and the delay time of the delay means.

9. A control method of a digital signal processing device, including:
a first buffer memory intended for accumulating audio data;
a second buffer memory intended for accumulating audio data;
a DRAM that burst transfers burst length audio data;
a delay means that delays audio data in units of sampling periods; and a control means, the method comprising:

writing audio data to the first buffer memory one word at a time in sequence at the sampling period, performing control to burst transfer the burst length audio data to the DRAM from the first buffer memory, performing control to burst transfer the burst length audio data to the second buffer memory from the DRAM, and outputting audio data to the delay means from the second buffer memory one word at a time in sequence at the sampling period, wherein a delay time of audio data output by the delay means is determined by a combination of a delay time of multiple sampling period units depending on the burst length of the DRAM and a delay time of a sampling period unit of the delay means, and wherein the first buffer memory writes audio data one word at a time in sequence at the sampling period, the first buffer memory burst transfers the burst length audio data to the DRAM, the DRAM writes the burst length audio data, the DRAM burst transfers the burst length audio data to the second buffer memory, the second buffer memory writes the burst length audio data, the second buffer memory outputs the audio data to the delay means one word at a time in sequence at the sampling period, and the delay means delays the audio data in units of the sampling periods.

10. A control method of a digital signal processing device, including:

a first buffer memory intended for accumulating audio data;

a second buffer memory intended for accumulating audio data;

a DRAM that burst transfers burst length audio data;

a delay means that delays audio data in units of sampling periods; and a control means, the method comprising:

writing audio data to the first buffer memory one word at a time in sequence at the sampling period, performing control to burst transfer the burst length audio data to the DRAM from the first buffer memory, performing control to burst transfer the burst length audio data to the second buffer memory from the DRAM, and outputting audio data to the delay means from the second buffer memory one word at a time in sequence at the sampling period, wherein a delay time of audio data output by the delay means is determined by a combination of a delay time of multiple sampling period units depending on the burst length of the DRAM and a delay time of a sampling period unit of the delay means, and wherein a delay time of the delay means is a delay time of an integer multiple of 1 or more of the sampling period, a delay time of audio data output by the DRAM is a delay time of an integer multiple of 1 or more of the burst length, the burst length is a length of multiple words, and the delay time of the audio data output by the delay means is the sum of the delay time of the audio data output by the DRAM and the delay time of the delay means.

* * * * *